United States Patent Office 3,709,952
Patented Jan. 9, 1973

3,709,952
DIMERIZATION OF OLEFINES
Guy Desgrandchamps, Billere, and Henri Hemmer and Michel Haurie, Pau, France, assignors to Société Anonyme dite: Société Nationale des Petroles d'Aquitaine, Courbevoie, France
No Drawing. Filed Dec. 23, 1969, Ser. No. 887,738
Claims priority, application France, Dec. 27, 1968, 181,328
Int. Cl. C07c 3/10
U.S. Cl. 260—683.15 D       13 Claims

ABSTRACT OF THE DISCLOSURE

Process for the dimerization and codimerization of olefines, which consists in maintaining the olefine or olefines in an inert solvent in contact with a catalyst system comprising a nickel-based complex formed of a cation, in which the nickel is combined with 6 molecules of an organic sulphoxide, and of an anion formed by a complex halide of a metal of Group VIII of the Periodic Table, the complex being accompanied by an organoaluminium compound.

The process can be carried out in accordance with two variants: either preparation of the catalyst in situ, this requiring an Al/transition metal ratio which is between 3 and 9, or preparation of the catalyst ex-situ (continuous process), this requiring an Al/transition metal ratio higher than 9.

---

The invention relates to the dimerisation and codimerisation of olefines in liquid phase, and particularly of lower olefines, that is to say, olefines having 2 to 4 carbon atoms. It is more specifically concerned with the dimerisation of propylene, with the object of obtaining a product very rich in methyl pentenes. The invention comprises a new process, and also a new dimerisation catalyst.

The dimerisation of lower alpha-olefines is an important industrial problem, to which considerable research has been devoted in recent years. Its main object is the production of $C_4$ and $C_6$ olefines, of which the subsequent pyrolysis provides dienes which are in great demand for the manufacture of elastomers; this is particularly the case with isoprene and butadiene, which are obtained from methyl pentenes and butenes. One fundamental problem in connection with this technique was in the choice of appropriate catalysts which permit the lower alpha-olefines to be dimerised in solution, with a good selectivity in the desired dimers, particularly the dimerisation of ethylene into butenes and that of propylene into hexenes. Various compounds of nickel have been proved to be of great interest in this respect, in conjunction with derivatives of aluminium, particularly organoaluminium. It is known in the arts, for example, to employ compounds such as nickel diisopropylsalicylate, acetyl acetonate and oleate, organic complexes of the type of n-allyl nickel halide, and especially complexes of this type of halides with phosphines.

Despite the number and the variety of the nickel compounds which have up to the present given acceptable results, the technique in question still called for improvements, because each of the types of catalysts which were used had certain defects in addition to its advantages. By way of example, although the nickel diisopropylsalicylate according to French Pat. 1,385,503 permitted a dimer with more than 86% of methyl pentenes to be obtained from propylene, its productivity is fairly low, not exceeding 1.4 kg. of dimer per gram of Ni per hour. This characteristic is even smaller, being less than 0.5 with nickel oleate, according to French Pat. 1,420,952, which nevertheless leads to a selectivity as regards hexenes of 90% and a content of about 70% of methyl pentenes. The catalyst comprising nickel acetyl acetonate with triphenyl phosphine and triethyl aluminium sesquichloride (Belgian Pat. 686,496) shows an activity of the order of 200 kg./g. of nickel per hour, and yields hexenes with a selectivity of 90%; however, this high productivity is only achieved by raising the temperature to the region of 60° C., and this requires the elimination of the heat which is produced. Selectivities as regards hexenes of the order of 88–95% and methyl pentene contents of about 75% with a productivity of more than 6 kg./g. of nickel per hour can be obtained according to Belgian Pat. 651,596, using the complex of π-allyl nickel iodide with triphenyl phosphine and aluminium ethyl dichloride, or the system $C_{12}H_{19}NiCl+AlCl_3$; however, these catalyst systems are difficult to prepare and delicate to manipulate, because they are very sensitive to the oxygen in the air; for giving such results, these catalysts require sufficiently low working temperatures, which are of the order of $-10$ to $-20°$ C.

The present invention provides an improvement, which consists mainly in the use of a catalyst which is easy to prepare and of which the highest level of activity is at the temperatures which can be most easily regulated, that is to say, equal to or slightly removed from 0° C. It is in fact known that, because of the strong latent heat of melting of ice, it is at 0°, or close to this temperature, that it is easiest to keep constant the temperature of the medium of an exothermic reaction. It is also in the region of 0° C. that the catalysts according to the invention lead to selectivities of dimers, with respect to the higher oligomers, higher than those of the prior art. These figures can exceed 95%, and the figure for a conversion is practically quantitative.

On account of the temperature at which the operation is carried out, the dimers contain a high proportion of 2-methyl-pent-2-ene, this being highly desirable for the preparation of isoprene. These contents can be more than 70% in the dimer which is obtained.

The productivity can exceed 200 kg./g. of nickel per hour for operations carried out continuously.

The new catalyst according to the invention is characterised in that it comprises a nickel-based complex formed of a cation, in which the nickel is combined with 6 molecules of an organic sulphoxide containing 2 to 20 carbon atoms, and of an anion formed by a complex halide of a metal of Group VIII of the Periodic Table of the Elements. Just as in the known dimerisation catalysts, the nickel complex is activated by an organoaluminium compound, preferably a halide of an alkyl aluminium.

The nickel sulphoxide complex in the catalyst according to the invention can be represented by the formula $$[Ni(R_2SO)_6]^{++}[MX_4]^{--}$$

in which R can be an alkyl group, preferably a methyl or an ethyl group, or an aryl group, preferably a phenyl, or it can even form with the second R a closed methylene, for example tetramethylene ring. In other words, the molecule $R_2SO$ can assume the form:

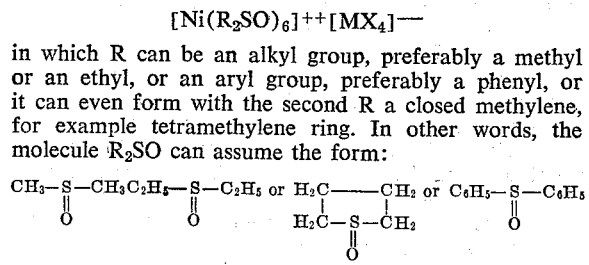

The metal M is a metal such as Fe, Ni or Co, or any transition metal of Group VIII, X being a halogen, particularly chlorine, bromine or iodine.

In accordance with one particular feature of the invention, the speed of activation of the catalysts, and consequently the speed of reaction, is improved, without the selectivity being lowered, by a small quantity of water being added to the catalyst system. This quantity must be between the very strict limits of 0 to 2 moles of H₂O per mole of nickel complex, because beyond these limits, the water has a harmful effect, causing the selectivity rate to be lowered.

Nickel sulphoxide complexes according to the invention can be easily prepared by the known processes. Thus, the complex [Ni(DMSO)₆][NiCl₄] can be prepared (as described in in J.A.C.S. 82, 6013, 1960) from anhydrous nickel chloride (0.15 mole) and a large excess of dimethyl sulphoxide (2.15 moles).

The crystals of the complex, which are blue in colour, are kept in the absence of humidity; the preparation of the complex [Ni(C₄H₄SO)₆][NiCl₄] is described in J.C.S. 2078 (1961). It is prepared from one mole of anhydrous nickel chloride and a large excess (10 moles) of tetramethylene sulphoxide. The complex $$[Ni((CH_5)_2SO)_6][FeCl_4]_2$$

(described in Recueil des Trav. Chim. Pays Bas 86, 201, 1967) is obtained in the form of crystals from hydrated iron chloride FeCl₃ and nickel chloride NiCl₂, in organic medium and in the presence of a dehydrating agent.

It is interesting to find that the favourable results according to the invention are only obtained when the catalyst contains the combination of the two divalent ions indicated in the formula given above. If the anion MX₄⁻⁻ is replaced by another anion, for example (ClO₄)₂ or (BF₄)₂, there is no dimerisation after 10 hours of reaction. If, on the contrary, it is the cation Ni(R—SO—R)₆ which is replaced by an inactive part, such as (C₂H₅)₄N, the dimerisation reaction is much slower than with the complex according to the invention. For example, when the anion part is formed by NiCl₄, twenty minutes in the presence of one molecule of water, and forty minutes in the absence of water, are required in order to effect the practically total conversion of propylene; after 18 hours of reaction, only 20% of propylene are converted if the anion part is formed by FeCl₄. It is accordingly a particularly surprising fact that ferric chloride which, in this last case, gives very poor results, leads to excellent results both as regards conversion and as regards selectivity when it appears in the complex [Ni((C₆H₅)₂SO)₆]⁺⁺[FeCl₄]⁻⁻.

On the other hand, by adding a sulphoxide R₂SO in a dimerisation medium containing a nickel halide and an organoaluminium compound, the dimerisation speed becomes more than ten times slower by comparison with the speed which is provided by the complex according to the invention.

The organic compounds of aluminium which are suitable for carrying the invention into effect, concurrently with the nickel complexes indicated above, can in general be the same as those which it is known to use in the prior art. These are particularly compounds of general formulae R₂AlX, RAlX₂ and R₃Al₂X₃. The radical R is generally an alkyl; in particular, alkyls such as ethyl, propyl, isopropyl, butyl or isobutyl are very suitable. The halogen X is generally chlorine and/or bromine.

The proportion of the organoaluminium compounds can vary relatively to that of the nickel complex within limits which are contained between 3 and 100. It is preferable for the atomic ratio between Al and transition metal in the catalyst system to be between 6 and 12 and, better still, between 7 and 9, when the catalyst is prepared in situ, that is to say, when the sulphoxide complex of nickel and transition metal, the solvent, the organic aluminium compound and olefine are introduced simultaneously into the autoclave. On the other hand, it is preferable for this ratio to be higher than 9 and preferably between 15 and 50 and, better still, between 20 and 30, when the catalyst is prepared ex situ, that is to say, before bringing it into contact with the olefine to be dimerised. It is within these limits that the best selectivity is obtained.

For a catalyst prepared in situ, the quantity of catalyst can be such that the weight of transition metal of the complex employed represents 0.05 to 5 g., in the case of nickel, per kg. of olefine subjected to the dimerisation. Excellent results are obtained with nickel contents of 0.1 to 1 g. of Ni per kg. of olefine; in the case of a catalyst prepared ex situ, this nickel content is from 0.005 to 1 g.; excellent results are obtained with contents of 0.01 to 0.5 g.

The dimerisation according to the invention can be carried out at temperatures from —50° to +80° C., but the most practical results are obtained between —5° and +10° C. Very good results, with conversions of practically 100%, are obtained at 0° C.; since it is this temperature which is, for the reason already referred to above, the easiest to keep constant, it represents the temperature which is by far the preferred temperature in carrying out the present invention.

The solvents suitable for the dimerisation which has been described are the liquids which are inert with respect to catalysts, and particularly the optionally halogenated saturated hydrocarbons, the aromatic or halogenated aromatic hydrocarbons; aliphatic, aromatic or cyclic ethers which are non-reactive with respect to the catalyst can also be suitable. The various common solvents are generally known in the art. Consequently, it is for example possible to employ toluene, xylene, chlorobenzenes, chloronaphthalenes; the halogenated aromatic solvents are the preferred solvents, because they lead to high reaction speeds, on account of the better solubility of the catalyst system. Liquid propylene can also serve as solvent, as well as the dimers produced in the reaction. It is advisable to select a solvent having a fairly high boiling point and a sufficiently low solidification point to be able easily to separate the dimers formed after the reaction without having any fear of a solidification at the low temperatures at which the dimerisation takes place. Therefore, according to one of the features of the invention, the solvent which is used is a monohalonaphthalene or dihalonaphthalene, and more particularly alpha-chloronaphthalene, the boiling point of which is at 259° C. with a solidification point of —20° C.

The process can be carried out in accordance with two variants. It is either possible to use a process in situ, that is to say, a process in which the catalyst, the solvent, the organic aluminium compound and the olefine are simultaneously brought into the reactor, or an ex situ process, which permits of operating continuously.

The operational procedure according to the first variant of the invention consists in effecting the dimerisation or the codimerisation of the olefines in a process in situ. In Examples 1 to 19, tests are described which were carried out in a stainless steel autoclave with a capacity of 125 ml., the autoclave having a double jacket for cooling purposes; a certain quantity of nickel sulphoxide complex was introduced into the autoclave under a nitrogen atmosphere. Then a certain volume of alpha-chloronaphthalene, and a determined quantity of aluminium ethyl sesquichloride Al₂Et₃Cl₃ were injected thereinto. A given weight of liquid propylene was condensed in the autoclave, cooled to 0°. The fall in pressure of the propylene in the autoclave, due to the dimerisation, was followed until from 90 to 100% of propylene had disappeared. At the end of the reaction, the catalyst was deactivated by adding 10 ml. of water. The organic phase was extracted and subjected to distillation: the conversion of the initial propylene and the composition of the product as formed were determined, and this enabled the selectivity as regards dimers with respect to the higher oligomers to be expressed.

The operational procedure according to the second variant of the invention permits conversion and selectivity rates to be obtained which are just as good as in the process in situ; it consists in preparing the activated catalyst before bringing it into contact with the olefine. This process in situ; it consists in preparing the activated catalyst ously, has a certain number of other advantages; it depends on a certain number of observations made by the inventor. The author of the present invention has in fact observed that, when the catalyst is prepared ex situ, that is to say, before it is brought into contact with the olefine to be dimerised, the Al/transition metal atomic ratios necessary for obtaining the best results are different from those which are necessary for obtaining the same results when the catalyst is prepared in situ. The value of this ratio has to be appreciably increased; the quantity of the nickel necessary for the dimerisation of the olefines is much lower than that used in the process in situ. From an economic point of view, this represents a great advantage, when the high cost of nickel is taken into account.

The process according to this second variant consists in preparing a catalyst of the form $Ni(R_2SO)_6.MX_4$, in activating it with an organoaluminium compound, so that the Al/transition metal elements are in an atomic ratio equal to or greater than 9 and in using this catalyst in operations where it is prepared before it is used with the olefine or olefines to be dimerised.

The nickel complexes $Ni(R_2SO)_6.MX_4$ are not directly active in this form. For making these complexes active, the nickel of the cation portion has to be reduced to a lower valency state by means of the organoaluminium compound. The author of the present invention has observed that the activation of the sulphoxide complex by the organoaluminium compounds is not instantaneous, but that it can last from 10 to 30 minutes.

Consequently, when operating in such a way that the nickel complex, organoaluminium compound, solvent and propylene are simultaneously introduced into the reactor, the active form of the catalyst is only gradually liberated. The quantity of nickel having actually participated in the catalysis is much less than the qauntity engaged in the complex. In the presence of the active complex, the reaction can be extremely rapid and even violent. It may be of the order of 2 to 3 minutes; when using the process in situ, the quantity of transition metal introduced into the catalyst is chosen so that the organoaluminium compound liberates in 2 or 3 minutes the quantity of active complex necessary for the reaction. Since the activation reaction lasts from 10 to 30 minutes, it is easily seen that the quantity of transition metal engaged in the catalyst is about 5 to 15 times higher than that which has actually taken part in the reaction.

The reaction time is in part a function of the quantity of nickel which is present. However, it is of no interest for this quantity of nickel to be too large, because a very rapid reaction is also very violent and there is a danger of a certain quantity of nickel not being used; it is preferable to choose quantities of nickel for which the productivity is best. The quantity of catalyst can be such that the weight of transition metal of the complex being used represents 0.005 to 1 g. in the case of nickel per kg. of olefine subjected to the dimerisation or codimerisation; excellent results are obtained with nickel contents of 0.01 to 0.5 g.

In order to prepare such a catalyst, the inactive complex $Ni(DMSO)_6NiCl_4$ (for example) and the organoaluminium halide are combined in suspension in a solvent.

The sulphoxide complex is insoluble in the solvents which are really suitable for the dimerisation. A homogeneous solution is only obtained after activation of these complexes with the organoaluminium halide. In order to obtain an efficient catalyst, it is necessary for this activation to be effected in the presence of a protective olefine. It is thought that this olefine, in being coordinated with the nickel atom of the active complex, stabilises this latter and prevents its decomposition into metallic nickel.

A certain number of olefines can be used with advantage for this purpose, but one particular form of the preparation of the catalyst consists in giving preference to the use of dimers of propylene. This use avoids the introduction of a supplementary compound which is extraneous to the reaction and which it would subsequently be necessary to separate out. However, since the active complex is only slightly soluble in the solvents, it is necessary to work in the presence of a more or less large quantity of co-solvent, which will permit catalyst solutions which are not too diluted to be obtained.

One preferred solvent is formed, for example, of ⅓ of propylene dimers and ⅔ of chlorobenzene. The quantity of complex which can be dissolved in this solvent corresponds to approximately 1 to 3 milli-atoms of nickel per litre.

It is necessary for the activation reaction and also the preservation of the activated catalyst to take place in an inert atmosphere, for example argon, because the catalyst solutions are extremely sensitive to atmospheric oxygen (which causes the precipitation of the metallic nickel) and to humidity (which hydrolyses the active complex). The activation of the sulphoxide complex can be followed qualitatively by the change in colouring, the inactive form being blue and the homogeneous active solution being yellow.

The activation of the catalyst complex can be effected at different temperatures which may range from $-30°$ to $+20°$ C. The activation speed increases with the temperature. However, for purposes of best preservation of the catalyst, it is preferable to work at low temperature. By way of example, for temperatures of $-20°$ C., the activation time can reach some hours. This time is a few tens of minutes when the activation is effected at $-10°$ C., and it is only a few minutes for a temperature of $0°$ C.

The nature of the halide being used also has an influence on the speed of activation of the complex. It has been possible to observe that the activation speed decreases when $Et_2AlCl$ is replaced by $Et_3Al_2Cl_3$, then by $EtAlCl_2$; this speed is a function of the reducer degree of the aluminium compound; however, $Et_2AlCl$, which is the stronger reducer, leads to the least active catalyst solutions, a part of the Ni being precipitated in metallic form. The ethyl aluminium sesquichloride $Et_3Al_2Cl_3$ is the preferred activation agent, which leads to the best selectivities as regards dimers. It is preferable to use it in such a way as to obtain the Al/transition metal ratio which is between 20 and 25.

When the active catalyst solution is prepared, it is kept at low temperature in an argon atmosphere. The stability of this solution permits it to be preserved for several days. However, it is preferably used in the few hours which follow its preparation and better still during the first hour. During the operation of dimerising or codimerising the olefines, the extraction of this solution and its introduction into the reactor must be carried out in the absence of air. The olefine to be dimerised or codimerised is then injected at constant pressure, into the cooled reactor.

The following examples illustrate certain forms of the invention without however limiting it.

Examples 1 to 19: Process in which the catalyst is prepared in situ (variant 1).

EXAMPLE 1

The catalyst comprises $0.35 \times 10^{-3}$ moles of

complex and $2.5 \times 10^{-3}$ moles of ethyl aluminium sesquichloride.

The quantity of α-chloronaphthalene is 10 ml. and the quantity of liquid propylene which is introduced is 30.6 g.

After 3 minutes 45 seconds, 93% of the propylene are transformed into 28.5 g. of liquid oligomers, from which are isolated 25.6 g. of $C_6$ dimers: this corresponds to a dimer selectivity of 90%. The dimers obtained are composed of 69.5% of methyl pentenes, 27.1% of hexenes and 3.4% of dimethyl butenes. The content of 2-methyl-pent-2-ene of this mixture was raised to 46.3%. It can be seen that the conversion of propylene in this preparation was 11.7 kg. per g. of nickel of the catalyst and per hour.

EXAMPLE 2

Instead of the nickel complex with 6 molecules of tetramethylene sulphoxide of Example 1, the corresponding complex of dimethyl sulphoxide $$[Ni((CH_3)_2SO)_6][NiCl_4]$$

is used in the present example.

$0.35 \times 10^{-3}$ moles of this complex are used concurrently with $2.5 \times 10^{-3}$ moles of $Et_3Al_2Cl_3$. Al/Ni=7.

The solvent is formed by 10 ml. of α-chloronaphthalene. 30 g. of liquid propylene are added.

After 2 minutes 13 seconds at 0° C., the quantity of liquid oligomers obtained is 28.6 g., this corresponding to a conversion of 95.5%.

The quantity of collected dimers is 27.4 g., i.e. a selectivity of 96%.

These dimers are composed of 71.4% of methyl pentenes, 25% of hexenes and 3.6% of dimethyl butenes. The proportion of 2-methyl-pent-2-ene is 55.1%.

The production of oligomers is here 18.75 kg. per g. of Ni of the catalyst and per hour.

EXAMPLE 3

In an operation similar to that of Example 2, the nickel complex is replaced by 2.10 millimoles of $$NiCl_2 \cdot 6H_2O$$

and 6.30 millimoles of $(CH_3)_2SO$. This again leads to a selectivity of 92% as regards hexenes and 75.4% as regards methyl pentenes in the product obtained but, in order to achieve a propylene conversion of 92%, 30 minutes are required instead of the 2 to 2½ minutes in Example 2. In other words, the production of oligomers is only 0.446 kg. per g. of Ni and per hour, instead of 18.75 kg. This shows the importance of using the dialkyl sulphoxide in combination with the nickel halide, in the form of a complex, and not simply as an adjuvant to nickel salts.

EXAMPLE 4

Operations identical with that of Example 2 were carried out at various temperatures and the results thereof are set out below.

| | Temperature, ° C. | | | | | | |
|---|---|---|---|---|---|---|---|
| | −40° | −28° | −10° | −5° | 0° | +5° | +10° |
| Time | 105′ | 51′ | 1′25″ | 1′15″ | 2′13″ | 1′25″ | 2′25″ |
| Conversion, percent | 33 | 66 | 91 | 94 | 96 | 99 | 99 |
| Selectivity, percent | 96 | 93 | 92 | 95 | 96 | 90 | 86 |

EXAMPLE 5

The operational procedure and the proportions are those of Example 2, but in the complex being used, the anion is formed by $FeCl_4$ instead of $NiCl_4$ and the cation by $$Ni((C_6H_5)_2SO)_6$$

The results are close to those of Example 2 (conversion 95%—selectivity 94%).

EXAMPLE 6

In a series of operations following the general procedure of Example 2, with a catalyst content corresponding to 1 g. of nickel per kg. of propylene, the Al/Ni atomic ratio is caused to vary.

The following results were obtained:

| Al/Ni | Time | Conversion, percent | Selectivity, percent |
|---|---|---|---|
| 7.15 | 2′13″ | 95.5 | 96 |
| 10 | 1′30″ | 99 | 88 |
| 20 | 1′30″ | 99 | 66 |
| 50 | 1′24″ | 92 | 35 |

As can be seen, the best selectivities are obtained with Al/Ni ratios in the region of 7. With smaller ratios, the reaction time would be longer.

EXAMPLES 7-12

The purpose of the following examples is to illustrate the influence of the presence of small quantities of water in the catalyst. The operations are carried out under the same conditions as those of Example 2, the number of water molecules per molecule of nickel complex being indicated in the table. In order to be able to appreciate in a more certain manner the influence of the presence of water on the reaction time, 90 g. instead of 30 g. of propylene were used.

| Example No. | Mole $H_2O$ for 2 Ni | Time | Conversion, percent | Selectivity, percent |
|---|---|---|---|---|
| 7 | 0 | 30′ | 95 | 96 |
| 8 | 1 | 24′ | 93 | 95.5 |
| 9 | 1.5 | 14′ | 92 | 94.5 |
| 10 | 2 | 8′ | 92 | 93.5 |
| 11 | 3 | 6′ | 90 | 89 |
| 12 | 4 | 3′ | 92 | 85 |

It is apparent from this that the addition of water shortens the reaction time, without there being any decrease in the selectivity, provided 2 moles of $H_2O$ per mole of nickel complex are not exceeded.

EXAMPLES 13-17

Operations according to Example 2 were carried out at 0° C. with the same molar proportions of other nickel compounds in place of the dimethyl sulphoxide complex of Example 2. The results of these operations are given below, compared with the results of Example 2.

| Example | Nickel compound employed | Time | Conversion, percent | Selectivity, percent | Percent methyl pentenes |
|---|---|---|---|---|---|
| 13 | $[(C_6H_5)_3P]_4Ni°$ | 3′30″ | 96 | 77 | 65.9 |
| 14 | Nickel acetyl acetonate. | 5′50″ | 98.5 | 79 | 68.8 |
| 15 | Ni acetyl acetonate plus $(C_6H_5)_3P$. | | 98 | 70 | 61.3 |
| 16 | $NiCl_2 \cdot [P(C_6H_5)_3]_2$ | 1′ | 100 | 67 | 63.4 |
| 17 | $NiCl_2 \cdot 6H_2O$ | 24″ | 91 | 76 | 75 |
| 2 | $Ni[(CH_3)_2SO]_6 \cdot NiCl_4$ | 2′13″ | 95.5 | 96 | 71.4 |

It is apparent that it is the catalyst of Example 2 which leads to the highest selectivity for hexenes; furthermore, in view of the high conversion which it gives, which conversion can be practically total, it supplies the highest yield of hexenes from propylene.

EXAMPLES 18-19

Operations in accordance with Example 2 were carried out at 0° C. with the same molar proportions of complexes of which the cation part is inactive.

The results of these operations are given below, by comparison with those of Examples 2 to 5.

| Example No. | Complex employed | Time | Conversion, percent | Selectivity, percent | Percent methyl pentenes |
|---|---|---|---|---|---|
| 18 | [(C$_2$H$_5$)$_4$N]$_2$[NiCl$_4$] | (1 mole H$_2$O) 20' (without water) 40'. | 99 | 88.5 | 76.3 |
| 18A | [(C$_2$H$_5$)$_4$N]$_2$[NiCl$_4$] | | 98 | 91.5 | 74 |
| 19 | [(C$_2$H$_5$)$_4$N]$_2$[FeCl$_4$]$_2$ | 18 hours | 91 | 81 | 77 |
| 2 | Ni[(CH$_3$)$_2$SO]NiCl$_4$ | 2'13'' | 95.5 | 96 | 71.4 |
| 5 | Ni[(C$_6$H$_5$)$_2$SO]$_6$(FeCl$_4$)$_2$ | 5' | 95 | 94 | 69.5 |

EXAMPLES 20-40

Process in which the catalyst is prepared ex situ (variant 2).

EXAMPLE 20

Preparation of the active catalyst solution 0.402 g. (0.55 mole) of Ni(DMSO)$_6$NiCl$_4$ complex are introduced into a 3-necked flask under a purified argon atmosphere. It is brought into suspension while stirring in 804 ml. of a solvent which is formed by ⅓ of dimers of propylene and ⅔ of chlorobenzene, carefully dried and distilled under argon. The reactor is kept at the temperature of 0° C. A certain quantity of organometallic compound, in accordance with the desired Al/transition metal ratio, is added dropwise. Thus, when 3.15 ml. of ethyl aluminium sesquichloride Et$_3$Al$_2$Cl$_2$ are added, the Al/Ni ratio is equal to 25, and when 6.45 ml. of a 50% solution of EtAlCl$_2$ in hexane are added, the Al/Ni ratio is equal to 28.

Solution prepared with Et$_3$Al$_2$Cl$_2$=solution A
Solution prepared with EtAlCl$_2$=solution B The activation is followed qualitatively by the change in colouring of the solution, which changes from blue to yellow. This catalyst solution is preserved under argon at 0° C. until the moment it is used.

The catalyst solution as thus prepared titrates 1.37 m. at. Ni/l.

EXAMPLES 21-26

Dimerisation

Into a 250 ml. stainless steel autoclave, thermostatically maintained at 0° C. by circulation of a liquid through a double jacket, are introduced under an argon atmosphere 40 ml. of catalyst solution A (containing 3.23 mg. of nickel) prepared as in Example 1. 30.6 g. of propylene are introduced, the temperature being kept at 0° C. The initial pressure is 5 bars. The lowering of the pressure permits the advance of the reaction to be followed. When the pressure falls to 0, the reaction is terminated. 10 ml. of water are added to deactivate the catalyst.

The organic phase is separated and distilled. The conversion in all the examples which follow is complete; the selectivity is calculated according to the collected dimers; the reaction speed or productivity (quantity of propylene transformed per g. of nickel and per hour) is likewise calculated.

In the examples which follow, the Al/Ni ratio is caused to vary.

| Example No. | Al/Ni | Reaction time in minutes | Selectivity of the C$_6$ olefins | Reaction speed per g. Ni/h., kg. |
|---|---|---|---|---|
| 21 | 10 | 160 | 95 | 3.5 |
| 22 | 16 | 120 | 95 | 4.75 |
| 23 | 22 | 100 | 94 | 5.7 |
| 24 | 25 | 30 | 95 | 19 |
| 25 | 30 | 25 | 93 | 22.8 |
| 26 | 50 | 13 | 86 | 43 |

The dimers of Example 25 are composed of 72% of methyl pentenes, 25% of hexenes and 3% of dimethyl butenes. The dimers obtained in the other examples have a similar composition.

It is seen from these examples that when the Al/Ni ratio increases, the reaction time becomes shorter, but to the detriment of the selectivity as regards dimers.

EXAMPLES 27-31

The purpose of the following examples is to illustrate the influence of the presence of small quantities of water in the catalyst. The operations are effected under the same conditions as those of Examples 21 to 26.

| Example No. | Al/Ni | Molar ratio H$_2$O/Al | Reaction time in minutes | Selectivity of C$_6$ olefins, percent |
|---|---|---|---|---|
| 27 | 25 | 0 | 30 | 95 |
| 28 | 25 | 0.3 | 14 | 95 |
| 29 | 50 | 0 | 13 | 86 |
| 30 | 50 | 0.1 | 6 | 90 |
| 31 | 50 | 0.3 | 3 | 88 |

It is apparent that the addition of water shortens the reaction time without there being any decrease in the selectivity, provided the value of 0.3 for the H$_2$O/Al molar ratio is not exceeded.

In the case of Example 30, it is deduced that there is a transformation speed of propylene of 95 kg. of propylene/g. Ni/h., at 0° C.

EXAMPLE 32

20 ml. of the catalyst solution A, in which Al/Ni=50, are used to convert 30.6 g. of propylene at 15° C. The transformation is complete in 5 minutes. The transformation speed of the propylene is 228 kg./g. of Ni per hour.

EXAMPLE 33

40 ml. of catalyst solution B, in which Al/Ni=28, are used for transforming 30.6 g. of propylene at 0° C. The reaction lasts 2 minutes. The transformation speed of the propylene is 283 kg./g. of Ni per hour.

All the dimers are obtained with a selectivity of 88%.

For these results, it is seen that the use of EtAlCl$_2$ leads to more active solutions than the solutions activated with ethyl aluminium sesquichloride, but the dimer selectivities are inferior. For a like result, the Al/Ni ratio has to be larger.

EXAMPLES 33-34

30 ml. of a catalyst solution B, in which the Al/Ni ratio is caused to vary, are used for transforming 30.6 g. of propylene at −10° C.

| Example No. | Al/Ni | Reaction time in minutes | Selectivity |
|---|---|---|---|
| 33 | 40 | 4.30 | 78 |
| 34 | 70 | 1.25 | 74 |

EXAMPLES 35-37

20 ml. of the catalyst solution B are used under the conditions of Examples 33 to 34.

| Example | Al/Ni | Reaction time in minutes | Selectivity |
|---|---|---|---|
| 35 | 50 | 17 | 84 |
| 36 | 70 | 4 | 75 |
| 37 | 100 | 2.5 | 70 |

EXAMPLE 38

Into a stainless steel autoclave, cooled to 0° C., are introduced under an inert atmosphere 80 ml. of catalyst solution A (Al/Ni=25) containing 6.4 mg. of nickel. Ethylene is introduced under a pressure of 1 bar. After a reaction time of 20 minutes, 42 ml. of liquid products are isolated, these having the following composition:

| | Percent |
|---|---|
| $C_4$ olefine | 61 |
| $C_6$ olefine | 36 |
| $C_8$ and higher olefine | 3 |

EXAMPLE 39

In the preceding example, the ethylene is replaced by but-1-ene. After 6 hours of reaction, the organic phase is isolated and distilled, this phase being formed by octenes.

EXAMPLE 40

In a 500 ml. stainless steel autoclave, kept at 25° C., 75 ml. of butenes are condensed. 200 ml. of catalyst solution A, in which Al/Ni=25, are added. The autoclave is cooled to a temperature of 0° C. and propylene is introduced at atmospheric pressure. After a reaction lasting 1 hour, the volatile products are eliminated, and then 51 g. of a crude liquid product are isolated, this product containing 37.5 g. of olefines, which have the following composition:

| | Percent |
|---|---|
| $C_6$ olefines | 30.5 |
| $C_7$ olefines | 46.5 |
| $C_8$ olefines | 23 |

We claim:

1. A process for dimerization or the codimerization of olefines which comprises contacting at least one olefine in an inert solvent with a catalyst system comprising a nickel-based complex of the formula $$[Ni((R)_2SO)_6]^{++}[M(X)_4]^{=}$$

wherein
R is an alkyl, aryl or R and R, together form a closed methylene group,
M is iron, nickel or cobalt, and
X is halogen and an organo-aluminium compound.

2. A process according to claim 1 wherein said nickel-based complex catalyst is prepared by reacting the nickel compounds with an alkyl aluminium halide selected from the group consisting of compounds of the formula $$R_2AlX, RAlX_2 \text{ and } R_3Al_2X_3$$

wherein R and X are as defined above, and the total atomic ratio of the aluminium to M is from 6 to 12.

3. A process according to claim 1 wherein M is nickel and said catalyst is employed in a ratio of 0.05 g. to 5 g. of nickel for each kg. of olefine.

4. A process according to claim 1 wherein the atomic ratio of the aluminium to said M is greater than 9.

5. A process according to claim 4 wherein a catalyst solution containing from 1 to 3 milliatoms of nickel per liter is employed.

6. A process according to claim 1 wherein the catalyst is employed in the form of a solution containing from 1 to 3 milliatoms of nickel per liter and a quantity of catalyst employed corresponds to 0.005 to 1 g. of nickel per kg. of olefine.

7. A process according to claim 1 wherein the reaction medium has added thereto a quantity of water which is between 0 and 2 moles of water per mole of nickel complex.

8. A process according to claim 1 wherein the catalyst is activated by treating said catalyst with an organo aluminium halide in the presence of a protective olefine prior to the dimerization reaction.

9. A process according to claim 1 wherein said R is methyl, ethyl or phenyl.

10. A process according to claim 2 wherein the total atomic ratio of aluminium to said M is 7 to 9.

11. A process according to claim 3 wherein said nickel is present from 0.1 to 1 g. for each kg. of olefine.

12. A process according to claim 4 wherein the total atomic ratio of aluminium to M is from 15 to 50.

13. A process according to claim 1 wherein said olefine is propylene.

References Cited

UNITED STATES PATENTS

| 3,379,706 | 4/1968 | Wilke | 260—683.15 X |
| 3,558,736 | 1/1971 | Bergem et al. | 260—683.15 |

PAUL M. COUGHLAN, JR., Primary Examiner

U.S. Cl. X.R.

252—431 R